United States Patent
Salen

(10) Patent No.: US 9,981,719 B2
(45) Date of Patent: May 29, 2018

(54) APPARATUS AND METHOD FOR PROVIDING ACTIVE MOTION COMPENSATION CONTROL OF AN ARTICULATED GANGWAY

(71) Applicant: ICD Software AS, Alesund (NO)

(72) Inventor: Ingolf Martin Salen, Langevag (NO)

(73) Assignee: ICD Software AS, Alesund (NO)

(*) Notice: Subject to any disclaimer, the term of this patent is extended or adjusted under 35 U.S.C. 154(b) by 331 days.

(21) Appl. No.: 14/906,234

(22) PCT Filed: Jul. 18, 2014

(86) PCT No.: PCT/NO2014/050131
§ 371 (c)(1),
(2) Date: Jan. 19, 2016

(87) PCT Pub. No.: WO2015/009163
PCT Pub. Date: Jan. 22, 2015

(65) Prior Publication Data
US 2016/0144932 A1    May 26, 2016

(30) Foreign Application Priority Data
Jul. 19, 2013 (NO) .................... 20131012

(51) Int. Cl.
*B63B 27/30* (2006.01)
*B63B 27/14* (2006.01)
(Continued)

(52) U.S. Cl.
CPC .............. *B63B 27/14* (2013.01); *B63B 27/30* (2013.01); *E01D 18/00* (2013.01); *G05B 15/02* (2013.01); *B63B 2017/0072* (2013.01)

(58) Field of Classification Search
CPC .......... B63B 27/14; B63B 27/30; E01D 18/00
(Continued)

(56) References Cited

U.S. PATENT DOCUMENTS 6,671,600 B1  12/2003  Hintzy
8,959,694 B2   2/2015  Clarke
(Continued)

FOREIGN PATENT DOCUMENTS

GB    2167714 A    6/1986
GB    2474374 A    4/2011
(Continued)

OTHER PUBLICATIONS

Supplementary Search Report dated Feb. 13, 2017 for European Application No. 14 82 6517.
(Continued)

*Primary Examiner* — Harry W Byrne
(74) *Attorney, Agent, or Firm* — Knobbe, Martens, Olson & Bear, LLP

(57) ABSTRACT

Apparatus (100) and method for providing active motion compensation control of an articulated gangway (200) which comprises at least one fixed part fixedly mounted on a sea going vessel, a movable part being movable relative to the fixed part, and at least one actuator for moving the movable part relative to the fixed part. A first position reference device provides position and attitude information (m) of the vessel referenced to earth. A second position reference device provides position and attitude information (y) of the movable part referenced to the gangway. An actuator driver generates an actuator control output in response to a regulator signal (R). An active motion compensation controller device receives the position and attitude information m and y, an operator control input (J), and the velocity information (yẏ) of the movable part. A differential kinematic (DiffKin) device compute and outputs a current position (p) and velocity (v) of the gangway endpoint from m and y. An active motion compensation (AMC) device computes and outputs a reference position (p̄p) and velocity (v̄v) of the
(Continued)

gangway endpoint from J, p and v computed by the DiffKin, An inverse kinematic (Inv) device computes and outputs a position reference ($\alpha$) and velocity reference ($\dot\alpha$) of the gangway endpoint from $\bar{p}$ and $\bar{\bar{v}}$ computed by the AMC. A regulator (Regulator) device computes and outputs said regulating signal (R) in response to inputs of said a position reference ($\alpha$) and velocity reference ($\dot\alpha$) computed by the AMC.

6 Claims, 9 Drawing Sheets

(51) Int. Cl.
  *E01D 18/00* (2006.01)
  *G05B 15/02* (2006.01)
  *B63B 17/00* (2006.01)

(58) Field of Classification Search
  USPC .......................................................... 700/275
  See application file for complete search history.

(56) References Cited

U.S. PATENT DOCUMENTS

| | | |
|---|---|---|
| 9,278,736 B2 | 3/2016 | Van Der Tempel |
| 2011/0038691 A1 | 2/2011 | Leske |
| 2013/0198979 A1* | 8/2013 | Dudson ................. B63B 27/143 14/71.3 |
| 2013/0212812 A1* | 8/2013 | Van Der Tempel .... B63B 27/14 14/71.7 |
| 2013/0283550 A1 | 10/2013 | Clarke |
| 2015/0344110 A1 | 12/2015 | van der Tempel |
| 2016/0068236 A1 | 3/2016 | Van Der Tempel |
| 2016/0304169 A1 | 10/2016 | Hessels |

FOREIGN PATENT DOCUMENTS

| | | |
|---|---|---|
| WO | 2011154730 A1 | 12/2011 |
| WO | 2012/021062 A1 | 2/2012 |
| WO | 2012/069825 A1 | 5/2012 |
| WO | 2012138227 A1 | 10/2012 |
| WO | 2014077694 A1 | 5/2014 |
| WO | 2014109640 A1 | 7/2014 |

OTHER PUBLICATIONS

International Search Report dated Nov. 27, 2014 for International Application No. PCT/NO2014/050131.
Written Opinion dated Nov. 27, 2014 for International Application No. PCT/NO2014/050131.

* cited by examiner

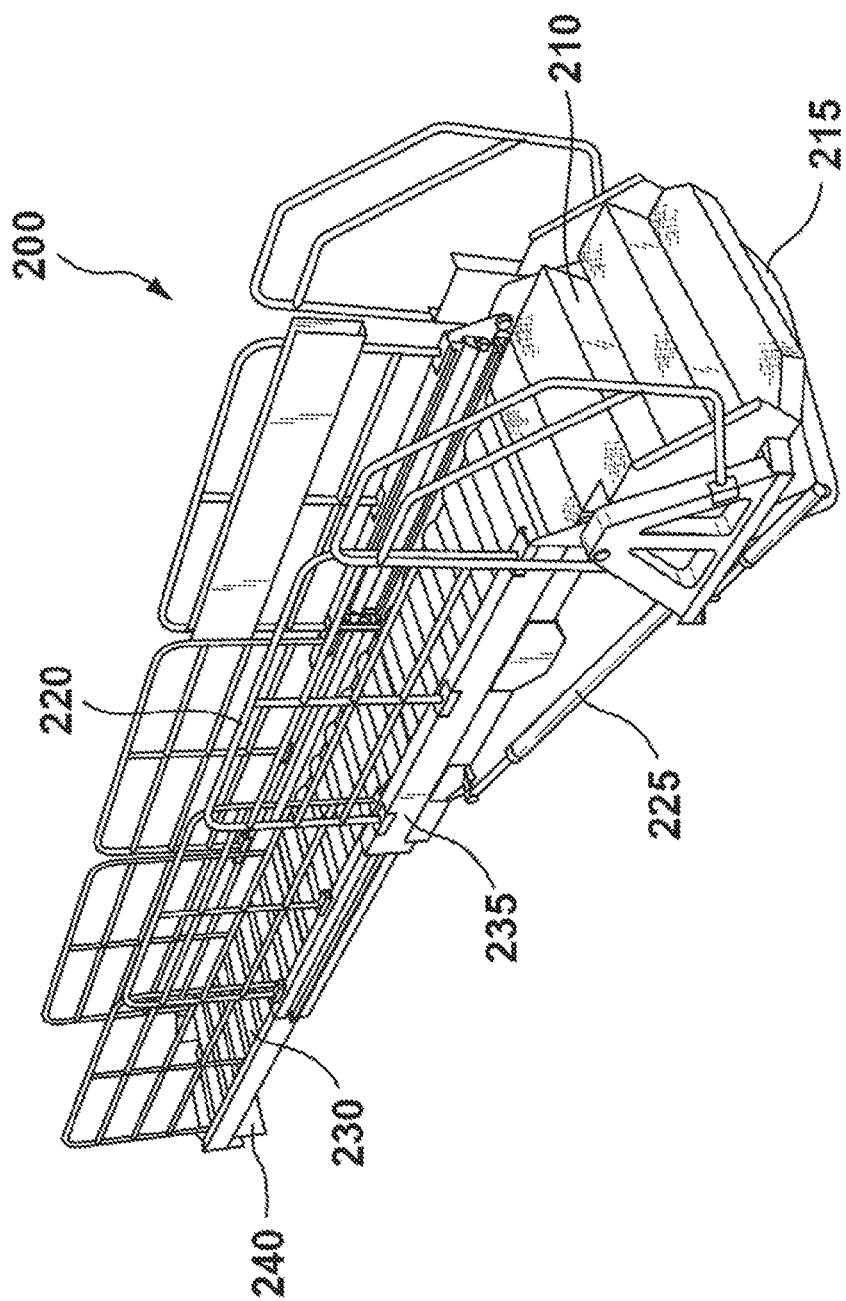

APPARATUS AND METHOD FOR PROVIDING ACTIVE MOTION COMPENSATION CONTROL OF AN ARTICULATED GANGWAY

FIELD OF THE INVENTION

The present invention relates to a method and system for controlling a gangway in a dynamic environment, and particularly a method and system for actively controlling a gangway being used to provide bridge between two vessel at sea that are moving in respect to each other due to sea motion.

BACKGROUND

Controlling a Gangway being Used to Provide Bridge Between Two Vessel at Sea that are Moving in Respect to Each Other Due to Sea Motion Short gangways are in use all over the world as a convenient and practical access method from a vessel to rig, wind turbine, shore, quay and other structures. Different design options are available, where length and other parameters are adapted by designers and suppliers to accommodate customers inputs and requests. Typically, the gangways are moveable in several degrees of freedom, using hydraulic or other types of actuators, and are operated by a skilled operator for safely establishing a bridge between vessels, or between vessel and a fixed installation, at sea or in harbour like environments. When operated, the functions of the gangway are typically controlled by the operator using joysticks, which may be part of a portable remote control unit or a fixed control unit located in a control cabin for the gangway.

Numerous such gangways and evacuation systems have been installed over the course of years, and gangways between vessels, or between vessel and a fixed installations have a been operating in periods counted in decades. Typical uses are for purpose built "Walk to Work" maintenance vessels and "Subsea Support" vessels, outfitted for offshore inspections, maintenance and repairs, in addition to general subsea work. These kinds of vessels equipment could also include long-reach offshore cranes and, vessels may be prepared for skid and ROV installations.

Gangways are in use all over the world as a critical and practical access method from a vessel to platforms, rigs, wind turbines and other structures in or at sea. Today, the wind turbine crew access operation is done by jamming the vessel bow against the wind turbine tower, which clearly is a risky operation.

Although gangways could be made in seawaterproof aluminium, making for a durable and lightweight constructions that is highly maouverable, there is always a risk that the operator may not be able to compensate for sea motion and other effects of the environment when attempting to manouver the gangway for establishing a bridge connection between vessels, or between vessel and a fixed installation. Missing an opportunity to establish the gangway bridge connection may result in cancellation of an important mission, which could lead to very high costs and risk of having to shut down the operations of an off-shore installation for lack of maintenance or lack of new crew. Accordingly, there is a need for a an active control solution for a gangway that will ensure safe, reliable and accurate motion compensation in the manouvering of the gangway that will allow establishing of a gangway bridge connection between vessels or between vessel and a fixed installation also under conditions when manual control may not be safely relied on.

Objects of the Invention

It is an object of the invention to provide an apparatus and a method for actively controlling a gangway to ensure safe, reliable and accurate motion compensation in the manouvering of the gangway for establishing of a gangway bridge connection between vessels or between vessel and a fixed installation also under conditions when manual control may not be safely relied on.

Other objects of the invention will become apparent from the following description of the invention.

SUMMARY OF THE INVENTION

The present invention provides an apparatus for providing active motion compensation control of an articulated gangway, the features of which apparatus are recited in the accompanying independent patent claim 1.

Features of embodiments of the apparatus of the invention are recited in the accompanying dependent patent claims 2-5.

The present invention provides a method for providing active motion compensation control of an articulated gangway, the features of which method are recited in the accompanying independent patent claim 6.

DESCRIPTION OF DRAWINGS

In the following, the invention will be explained both generally and by way of exemplary embodiments, and with reference to the figures of the accompanying drawings, in which FIG. 1A is a first perspective view drawing of a small gangway having an end-point adapted for "TeleTension" mode of operation;

DETAILED DESCRIPTION AND EMBODIMENTS

Figure 1B:
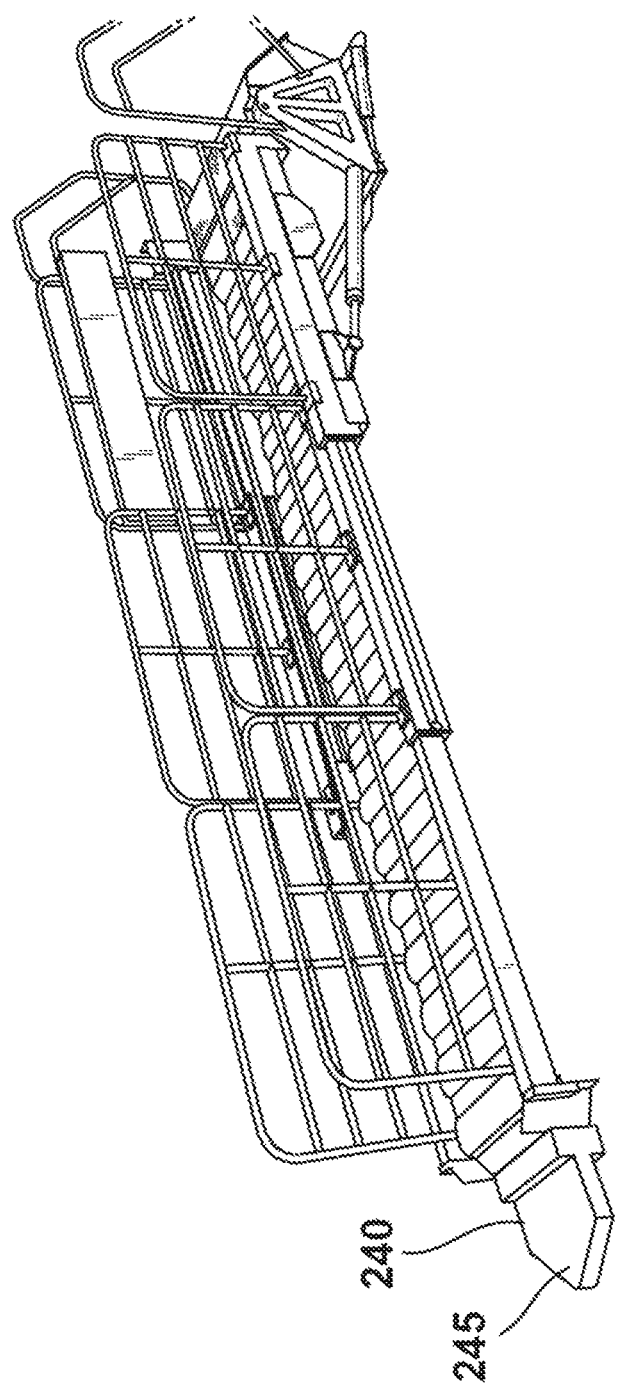
FIG. 1B is a second perspective view drawing of the small gangway illustrated in FIG. 1.

The apparatus of the invention and method of operation will be described in the following also by way of exemplary embodiments and with reference to the accompanying drawings.

A gangway employing gangway control in accordance with the present invention is well suited for use both in polar and tropic regions, and the structural as well as system integrity are provided.

The controlled gangway according to the invention also provides a permanent motion compensated gangway system for safe and easy access to and from offshore installations.

A gangway system incorporating the control method or system of the present invention is a unique motion compensated gangway installation that provides for operation in at least two main modes: a first long-duration connection mode, in which the gangway is capable of operating unattended by operators, and a second push-on-mode, in which the gangway provides quick mobilization. Hence, with the push-on-mode, landings can be done very quickly against structures of almost any kind. The system of the invention provides for a multitude of redundancies and safeguards to ensure that gangway connection provided by way of the present invention is a secure and failsafe solution.

With the novel new control method or system of the invention, it is also possible to compensate for movements of the vessel carrying the gangway against a freely floating object, such as a floating production, storage, and offloading (FPSO) installation, another vessel, a capsized vessel, or even a person lying in the water.

According to the invention, a gangway provided with a solution according to the invention is capable of establishing and maintaining a permanent motion compensated gangway connection from a vessel to a substantially stationary offshore installation for safe and easy access to and from offshore installations. The gangway employing the method or system of the invention allows the crew via a motion compensated gangway to transfer safely from a transport vessel to the off-shore wind turbine installation. The vessel is free to move with the sea, but the end-point of the gangway is maintained substantially stationary against the tower. The transport vessel may be equipped with propellers or waterjets, with or without dynamic positioning (DP) means, and may be of catamaran or single hull type. Consequently, it will be operational in heavier seas than what is possible with the conventional thrust lock-on technique.

In accordance with the invention, heave and pitch are absorbed using the active motion compensation provided by the present invention. It is contemplated that the motion detection is based on signals from a traditional motion reference unit, MRU, facilitating stationary object access. As an alternative or a supplement to the motion reference unit, an object recognition system is contemplated, which makes it possible to compensate for relative movements of two freely floating and independent vessels. Therefore, the gangway employing the control solution of the present invention is not only for the wind turbine industry, but also for rescue, navigational aid maintenance, pilots, and much more. Considering different types of gangways that are considered initially for employment of the invention, the primary use for the small gangway is a crew transport gangway, providing access from small crew transport vessels to wind turbines or other constructions, lighthouses, disabled vessels, and so on. Typical uses are wind turbine service and maintenance, evacuation of vessels or installations, and near shore crew transport. The use for the large gangway is mainly for access from large construction support vessels to any other construction or vessel, and the typical use is transportation of manual construction crew, evacuation of larger platforms or vessels, crew change on offshore installations, and offshore decommissions.

A typical gangway, such as the Uptime Gangway has a nominal length of 19.4 m. The telescopic function provides dynamic gangway length adjustment in a range of +/−4 m, meaning that it is extendable and retractable up to 4 m from its nominal length.

The control solution of the present invention enables three operating modes:

A first "landing mode", in which the gangway will be compensated actively during the landing procedure. After the gangway has been landed, it is put into a passive mode, making the gangway follow the relative movements as long as needed. Advantageously, in the passive mode, actuators that directly or indirectly couple elements of the gangway to the vessel, are set to a "free" state so as to decouple the actuated element from another element in respect of which it is actuated by its actuator.

A second "constant load mode", in which the gangway is fully motion compensated actively during the landing procedure, and after landing the gangway is kept positioned relative to the landing point by actively removing the load on landing point, so as to maintain a stable pressure on the landing point of the gangway against a fixed installation or other installation that is considered stationary with respect to ground.

A third "hover mode", in which landing the gangway is made as smooth as possible, and in which the gangway attached to the vessel is controlled by using an "active motion compensation (AMC) mode" to position and maintain the gangway tip at a fixed point relative to a landing area or other point on a fixed installation or other installation that is considered stationary with respect to ground.

The control system provides the overall monitoring and control of the safety functions in the system. The gangway outreach, gangway angle, slewing position, and vessel movements are measured, and the control system is arranged to decide what, if any, counter movements are necessary.

For safety monitoring and control, the system is provided with gangway attached sensors, preferably having built-in self-monitoring. The control system is adapted to detect errors and continuously monitor control signals and actual behavior. The control system automatically adjusts calibration of hydraulic valves for controlling hydraulic fluid to gangway actuators within defined areas. If adjustment is not possible, the control system will set a warning or error dependent on the situation.

For monitoring on bridge, an extra monitoring system on the bridge is provided to enable operational monitoring and control. The control system is adapted for integration with a dynamic positioning (DP) system on the vessel, thereby improving safety.

The system provides an emergency mode, which preferably is activated automatically. Automatic activation of the emergency mode occurs when the system is outside allowable operating limits. A pre warning will be given, using audible and visual warning signs when reaching a preset limit value for a critical operational parameter. When in the emergency mode, the control system controls the actuators to raise the gangway to its upper most position and to retract the telescoping part of the gangway to its inner most position. Hydraulic pressure to actuators for these operations is typically stored in a hydraulic accumulator. The slewing of the gangway can be operated manually, but if the reason for an emergency lift off is a failure of a power supply for providing power to actuator motors or failure of a hydraulic high pressure unit (HPU) for providing hydraulic pressure to hydraulic actuators, then the lifting and retracting motions take priority.

The system provides for a full manual mode of operation, in which manual operation of the hydraulic fluid valves on the HPU are made to move the gangway in case of control cabin or other control system damage.

The smaller gangway 200 of FIGS. 1A and 1B includes a slew element 210 actuated by a slew actuator 215 to rotate about what is referred to herein as the slew axis, and a pivoting, elongate boom element 220 actuated a boom actuator 225 to pivot about what is referred to herein as the boom axis, the boom axis being typically arranged perpendicular to the slew axis for advantageously allowing movement of an end point of the gangway in upwards and downwards directions in a plane that is coinciding with the slew axis. The pivoting boom element 220 includes a telescopic arrangement 230 of boom components that allows dynamic adjustment of the length of the boom element, and the boom components are actuated by an extension actuator 235 to shift the boom components along what is referred to herein as the telescopic boom longitudinal axis, or just telescopic axis, for simplicity. In the smaller gangway 200 of FIG. 1, a telescopic element provides an end-point 240 of the gangway that includes a landing tip 245, by which the gangway is adapted for "TeleTension" mode of operation in which the end-point is held against a landing surface or landing point 400 on the stationary installation by a constant force, typically applied by the actuator of the telescopic joint of the gangway.

Figure 2:
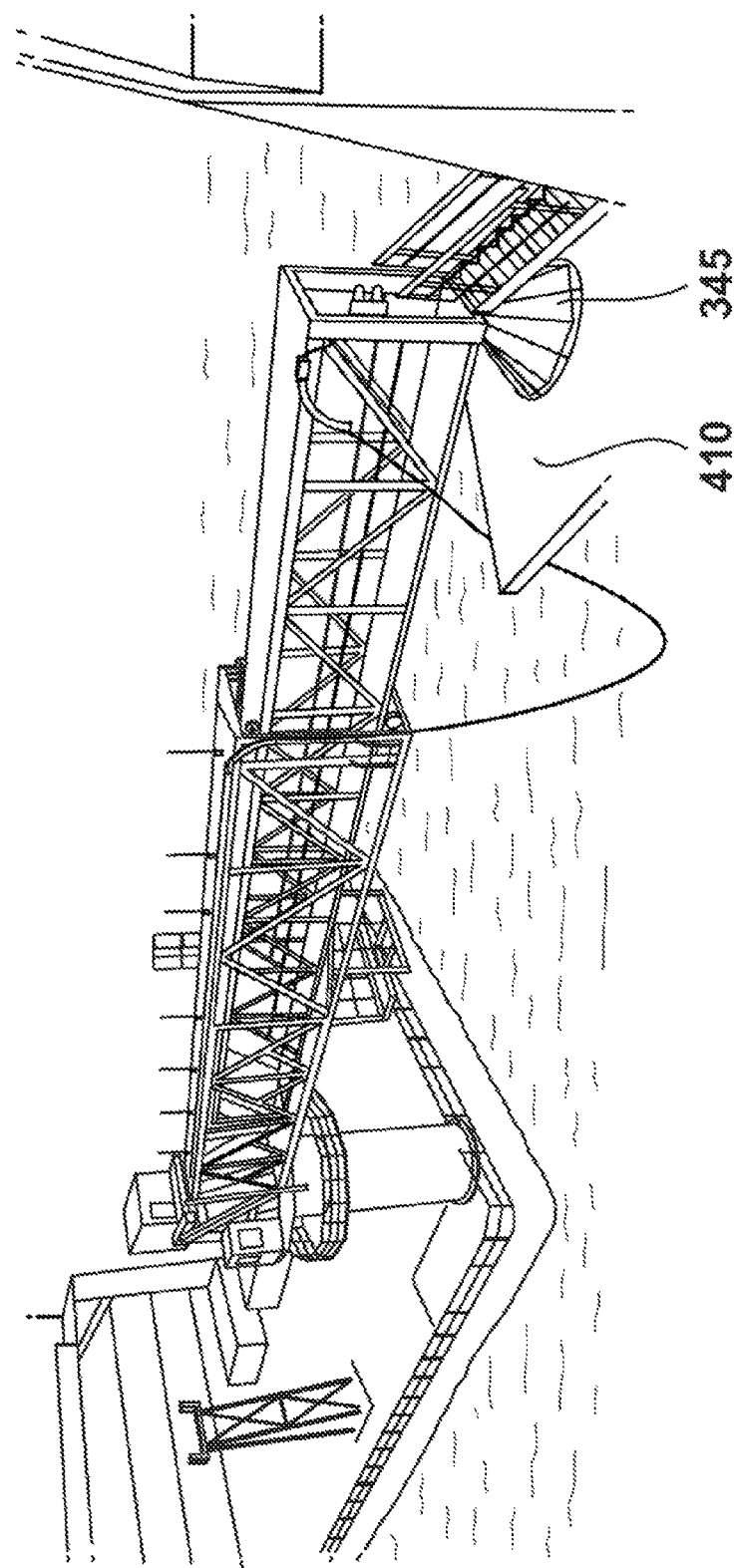
FIG. 2 is a photographic perspective view illustration of a large gangway fitted on a smaller free floating vessel with its end-point landed on a substantially horizontal surface of stationary rig installation, bridging the free floating vessel to the left in the picture to the stationary rig installation to the right in the picture.
Figure 3:
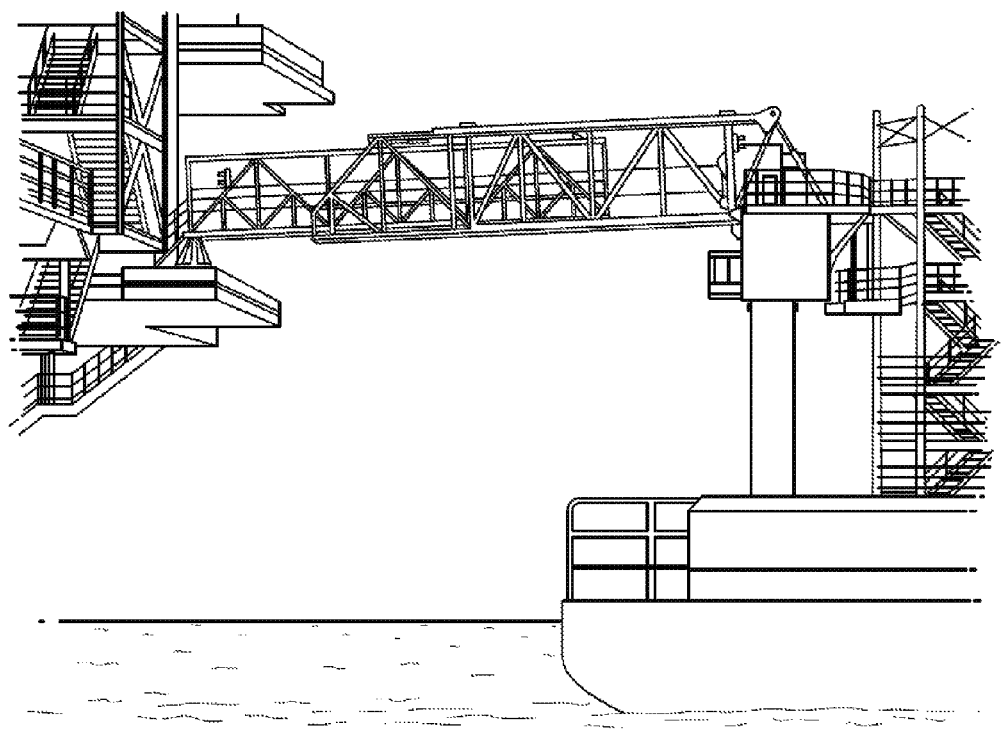
FIG. 3 is a photographic perspective view illustration of a large gangway fitted on a smaller free floating vessel with its end-point landed on stationary rig installation, bridging the free floating vessel to the right to the stationary rig installation to the left.
Figure 4:
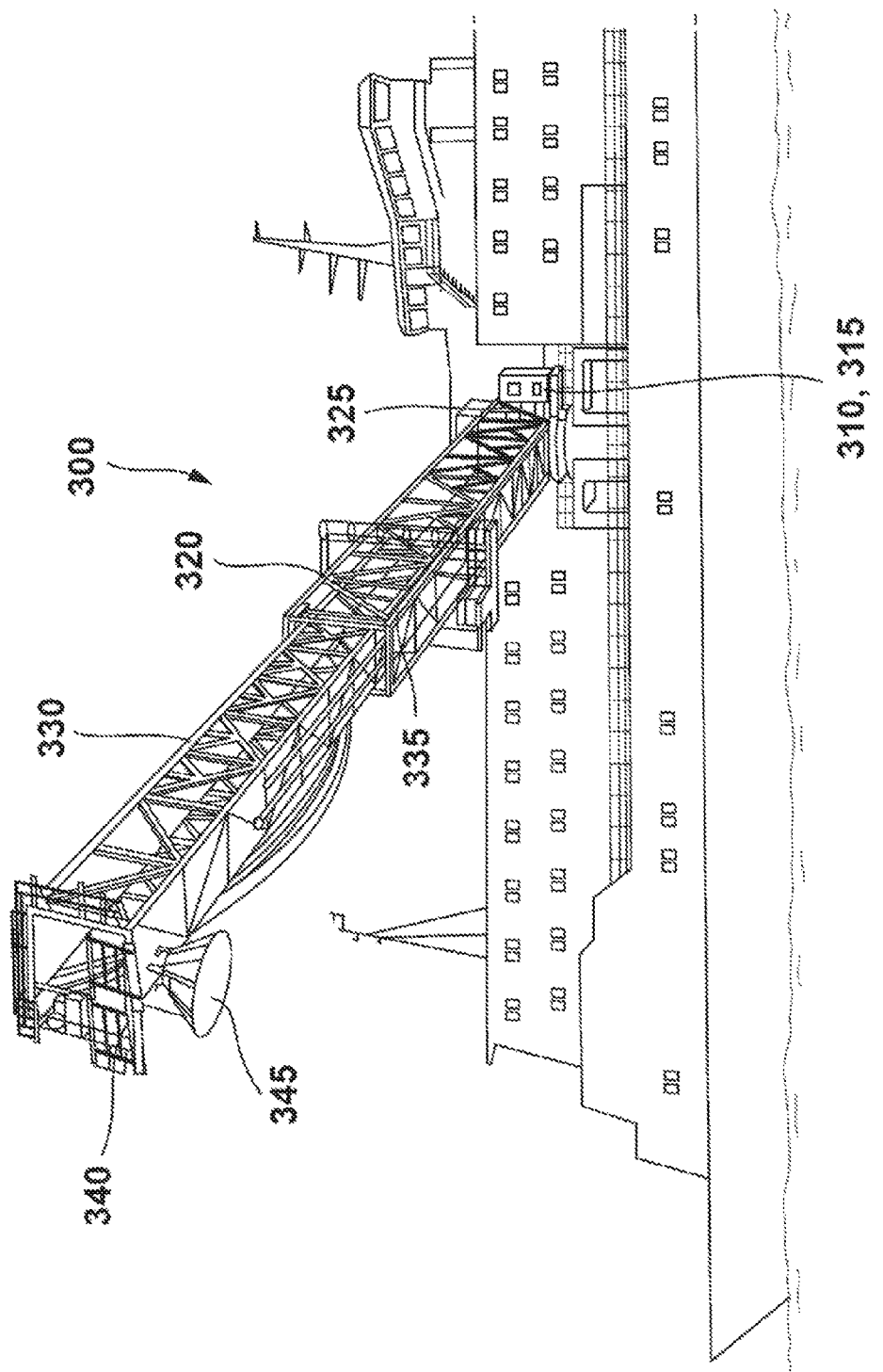
FIG. 4 is a photographic perspective view illustration of a large gangway fitted on a free floating larger vessel with its end-point deployed into open space and its telescopic section fully extended.

FIGS. 2, 3 and 4 illustrate embodiments of a larger gangway 300, which similar to the smaller gangway of FIGS. 1A and 12B include a slew element 310 actuated by a slew actuator 315, a pivoting, elongate boom element 320 actuated a boom actuator 325, and a telescopic arrangement 330 actuated by an extension actuator 335. In the larger gangway 300 of FIGS. 2, 3, and 4, a telescopic element provides an end-point 340 of the gangway that is adapted for landing and resting the end-point on a landing surface 410 of a substantially stationary installation, by including a landing cone 345.

Figure 5A:
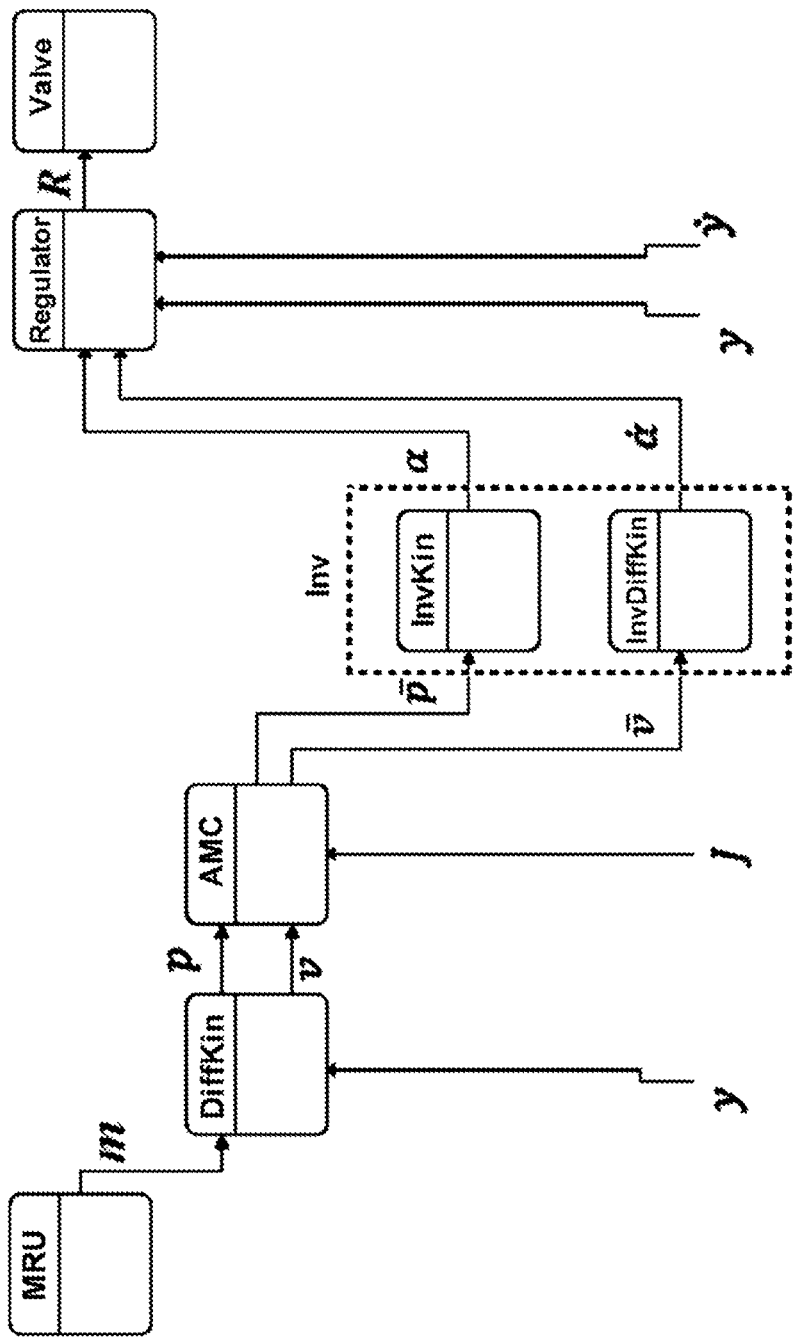
FIG. 5A is a schematic block diagram of a first exemplary embodiment of an active motion compensating gangway controller according to the invention.
Figure 5B:
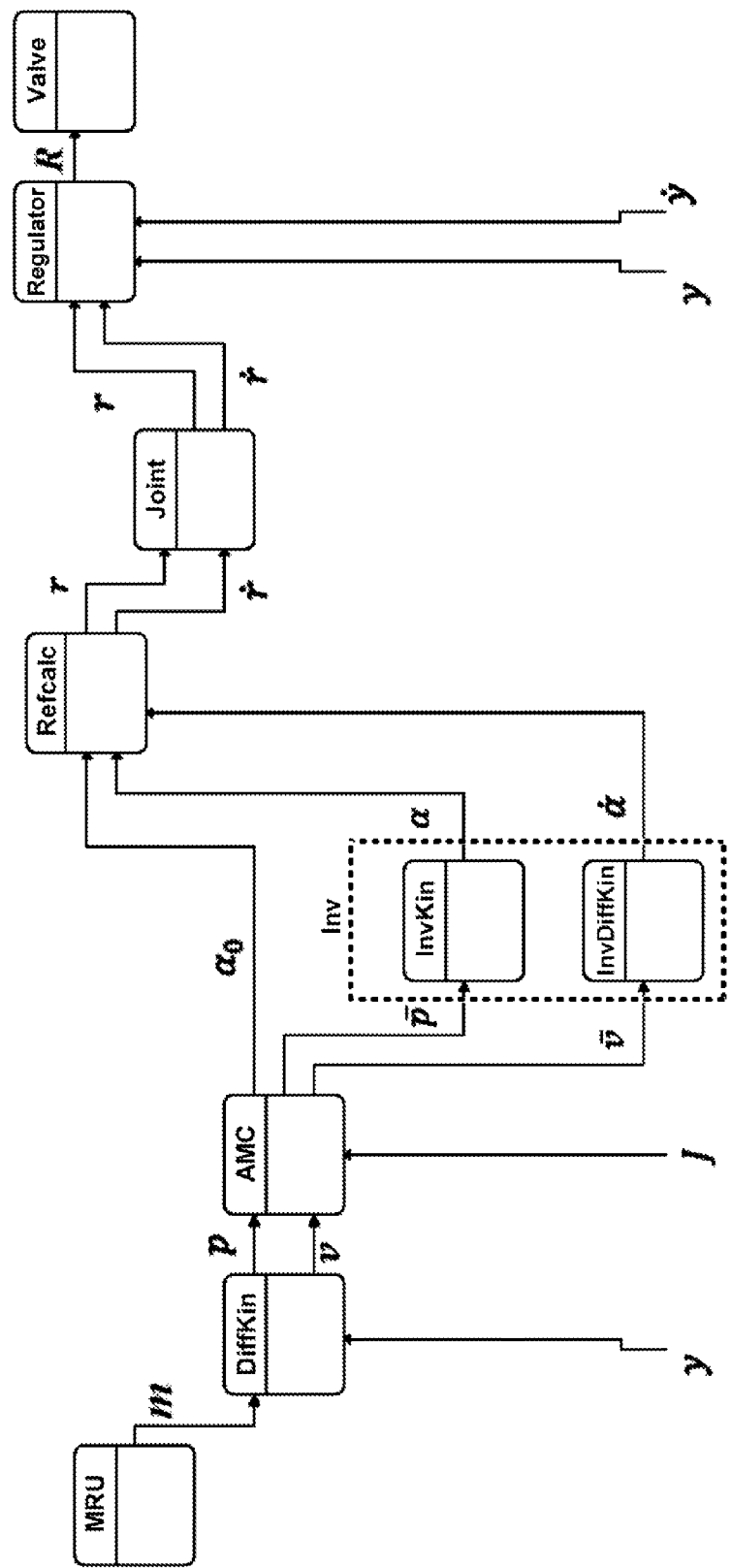
FIG. 5B is a schematic block diagram of a second exemplary embodiment of an active motion compensating gangway controller according to the invention.
Figure 6:
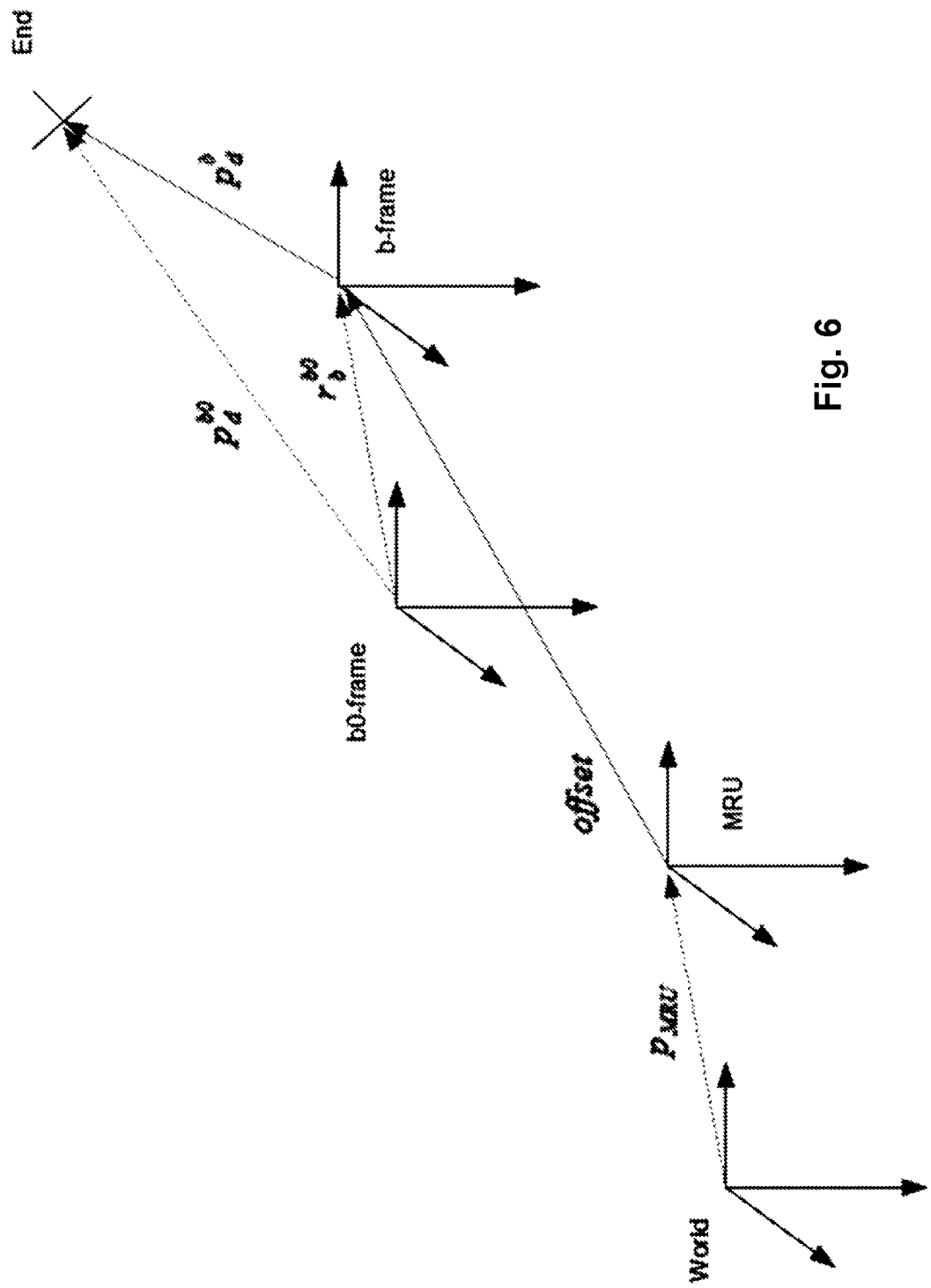
FIG. 6 is a schematic vector diagram illustrating by way of example the functions of the AMC.

With reference to the schematic diagram illustration of FIGS. 5A, 5B, and 6, further details of an exemplary embodiment of the active motion compensated gangway controller are explained in the following.

Gangway Controller

In the following, further details of the structure and functioning of the controller for the active motion compensated gangway is disclosed.

A gangway suitable for employment of the controller of the invention is typically built with three moveable joints; a slew joint providing rotation of the gangway, a boom joint providing up and down movement of the gangway, and a telescope joint providing adjustment of the length of the gangway. These joints are actuated, such that the gangway is capable of being moved in three degrees of freedom, respectively, with reference to the vessel onto which the gangway is mounted. When mounted on a sea-going vessel, the entire gangway is affected by the vessel movement due to wind and sea movement. When docking with a facility such as a rig or wind turbine, which is typically less affected or not affected by these disturbances and therefore may be considered stationary with respect to earth, the docking part of the gangway, which is the outermost end point of the gangway, will move with respect to the landing surface on the rig or wind turbine.

According to the invention, the movements of the vessel relative to the earth are measured, and the joints are actuated to keep the end point of the gangway stationary with respect to earth, so as to compensate for these movements. Measurements of the movements of the vessel are typically made by a Motion Reference Unit (MRU), and calculations are made to determine what the positions and velocities of each of the joints must be in order to keep the endpoint of the gangway stationary relative to a selected point on the stationary installation, which point typically is the landing surface designated for receiving the end point of the gangway.

AMC Controller

The functional structure of an Active Motion Compensation (AMC) controller according to the present invention is shown in figure X. The controller applies both feed-forward and feedback control, and is designed to separate between two different reference frames, an earth-fixed (world-frame) and a vessel-fixed (vessel frame). In addition, joint coordinates are the generalized coordinates of the gangway, i.e. the positions and velocities of the joints. The MRU measures the position and motion of the vessel relative to the world-frame, however this will be different from that of the end-point of the gangway. Therefore, the controller includes device for differential kinematics that is adapted to calculate back and forth between the world-frame, the vessel-frame, and the co-ordinates of the gangway.

To handle start-up, several or states, are present in the controller. In the manual state the gangway is not compensated, but holds a constant position relative to the vessel (i.e. the joints are static). When active motion compensation is activated, the system goes into a fade-in state, in which the controller provides a soft transition of the gangway control from being based on a manually provided control reference to the controller computed active motion compensated reference. In the active motion compensation state, the gangway is fully compensated. When the active motion compensation is deactivated, the controller provides a fade-out state doing the opposite of the fade-in state, in which the controller provides a soft transition of the gangway control from being based on the controller computed active motion compensated reference to a manually provided control reference. In its simplest form, the soft transition is time based.

Below is a description of each component in the AMC-controller being illustrated in FIG. 5A, and of the functions of the components.

Element DiffKin reads the position and velocity information m of the vessel, provided by the motion reference unit (MRU). Advantageously, the position and velocity information m of the vessel is for a total of 6 degrees of freedom (DOF). Thus, a total of 12 measurements are acquired from the MRU by the DiffKin element. DiffKin also reads the current joint coordinates y. On basis of the position and velocity information m of the vessel and the current joint coordinates y, the DiffKin element computes the current position p of the endpoint of the gangway in the world frame, and also the velocity v of the endpoint of the gangway in the world frame. The computed velocity v is the velocity that will be compensated for by feed-forward.

The AMC element has an input for receiving a operator manual gangway control input J, and inputs for receiving from the DiffKin element the computed current position p and the velocity v of the endpoint of the gangway in the world frame. On basis of these inputs, AMC element computes the reference position $\bar{p}$ in the vessel-frame which represents the desired position. The AMC element also computes the feed-forward velocity in the vessel frame, that is required to hold the gangway endpoint stationary in the world-frame, thereby establishing what is commonly referred to as a fully determined inverse-kinematics problem. When the fade-in state is entered, the AMC element also saves the initial joint coordinates $\alpha_0$, which is to be faded from during the soft transition to active motion compensated operation, and feeds the initial joint coordinates $\alpha_0$, to Refcalc element for the control system.

In the following, the AMC element is explained with reference to the accompanying FIG. 6. The world frame, also referred to as w-frame, is the earth "fixed" world co-oridnate reference frame. By "fixed" it is meant that the frame is stationary with respect to rapid movements, however, over time it may moves slowly to where the MRU is placed in a world position reference system. The b-frame is the base frame that is located fixed at the base of the gangway. The b0-frame is the frame with respect to which the b-frame is moving. End denotes the position of the gangway end point. The motion reference unit (MRU) outputs data that describe its position and movement relative to the fixed w-frame. When attached fixedly to the vessel, the MRU data describe the position and movement of the vessel relative to the earth fixed w-frame. Accordingly, the b-frame frame moves relative to the b0-frame according to the measured movement relative to the "fixed" w-frame with the rotation matrix from b-frame to b0-frame.

The AMC calculates the desired gangway position and speed given in the b-frame. The position and movement vectors are dynamically calculated from the opposite movement of the b-frame relative to the b0-frame and the desired position, at which the end point of the gangway is to be located, given in the b0-frame. The movement of the b-frame relative to the b0-frame is the same as the measured movement of the motion reference unit (MRU) relative to w-frame, with correction for the position of the b0-frame relative to the w-frame.

In the following, computations made by the AMC are described by way of example, and with reference to FIG. 6:

Calculations $p_b^w = p_{MRU}^w + R_b^{b0} * \text{offset}$ $p_a^{b0} = p_a^w - \text{offset}$ $r_b^{b0} = p_{MRU} + R_b^{b0} * \text{offset} - \text{offset}$ $p_d^b = (R_b^{b0})^T * (p_d^{b0} - r_b^{b0})$ $v_d^{b0} = (R_b^{b0})^T * v_d^w$ $p = p_d^b$ $v = v_d^b$ wherein
$p_{MRU}^w$=MRU stage/sway/heave pos vect in w-frame
$q_{MRU}^w$=MRU roll/pitch/yaw angle vect in w-frame
offset=measuring point relative to MRU
$J^{gw}$=joint pos vector in gangway coordinates
$p_a^w$=current gangway end pos in w-frame
$v_d^w$=current gangway end vel in w-frame
$R_b^{b0}$=rotation matrix from b-frame to w-frame
$(R_b^{b0})^T$=rotation matrix from b-frame to w-frame
$p_b^w$=vect from w-frame to b-frame to w-frame $p_a^{b0}$=vect from b-frame to end in b0-frame
$r_b^{b0}$=vect from b0-frame to b-frame in b0-frame
$p_d^b$=desired end pos in b0-frame
$p_d^{b0}$=: reference pos vect in b-frame
$v_d^{b0}$=reference vel vect in b-frame The following description of a part of the AMC device or method that is adapted for computing and outputting gangway control data or signals shall be read in context of the above AMC description. The moving of the desired position of the end point of the gangway is done in the b0-frame. This will make movement of the end point of the gangway logical to the operator. The slew movement is dependent of the current radius position relative to the b-frame, the radius is moved relative to the b-frame and the heave position is relative to the current position in the b-frame.

In the following, computations made by the AMC that are related to manual joystick inputs (J) are described by way of example, and with reference to FIG. 6:

Calculations $rXY\mathrel{+}=\text{JoystickTele}$ $p_d^{b0}(0,0)=rXY*\cos(\text{slewRef})$ $p_d^{b0}(1,0)=rXY*\sin(\text{slewRef})$ $\text{slewRef}\mathrel{+}=\text{JoystickSlew}$ $\text{boomRef}=\tan^{-1}((p_q^w(2,0)-a)/(rXY-b))$ $p_d^{b0}(2,0)=\text{JoystickBoom}$ wherein
rXY=radius in xy-plane given in b0-frame
slewRef=slew angel reference
boomRef=boom angle reference
a=constant
b=constant
JoystickSlew=Joystick contribution for slew
JoystickBoom=Joystick contribution for up/down
JoystickTele=Joystick contribution for in/out The InvKin element is adapted to solve the 3-DOF inverse kinematics problem, and based on computes the desired joint positions $\alpha$ that are needed for the gangaway end point to be located at the reference position (Used in feedback control in Regulator).

The InvDiffKin element is adapted to solve the 3-DOF inverse differential kinematics problem, and computes the joint velocities a that are needed to keep the endpoint of the gangway stationary in the world frame (Used in feed-forward control in Regulator).

The Refcalc element does the fading between the Manual and AMC states, and feeds the joint references towards the low-level controllers. Initially in the fade-in state, Refcalc will simply output $\alpha_0$ and a zero vector as position and velocity reference respectively, and slowly fade over to $\alpha$ and $\dot{\alpha}$.

The Regulator element provides low-level control of the joints of the gangway. It incorporates a PID-controller and a gain for the feed-forward control loop for positioning the end point of the gangway at the desired point in space, involving determining differences between the computed position to $\alpha$ and velocity $\dot{\alpha}$ of the gangway end point in the gangway reference system and the actual position y and velocity $\dot{y}$ of the gangway end point in the gangway reference system.

The Joint element converts the reference to flow souted for hydraulic actuator systems of the gangway.

The Valve element is the component for physically controlling the hydraulic valves for the hydraulic actuators or the electric power for electric actuators that actuate the gangway. It converts the desired joint velocity from the regulator into a set-point for the proportional valve setting or electric power feed setting.

Figure 7:
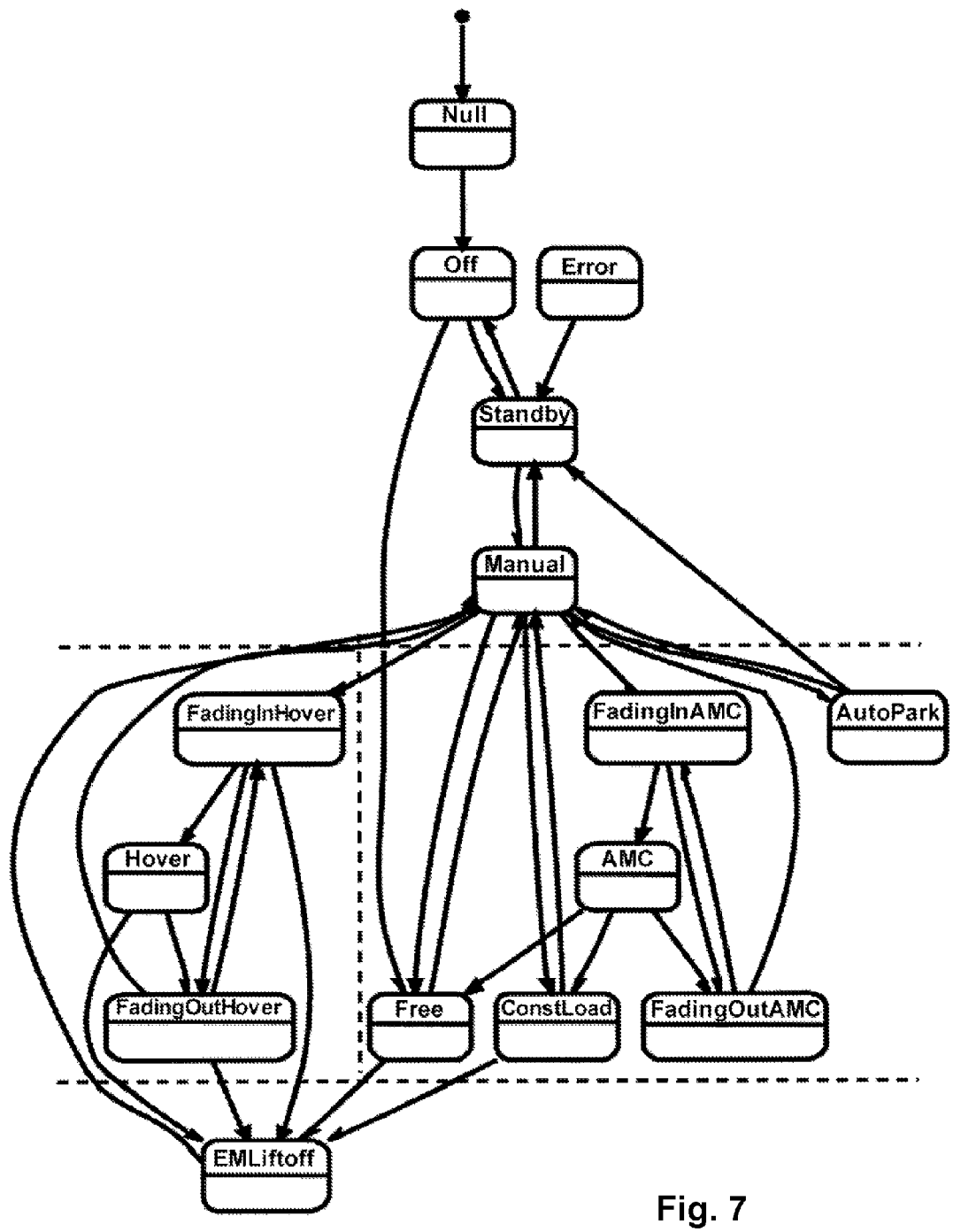
FIG. 7 is schematic state diagram of states of an active motion compensated gangway provided by an embodiment of an active motion compensating gangway controller according to the present invention.

In the state diagram of FIG. 7, dotted lines are drawn to indicate, a) the manual control mode above the horizontally drawn lines, b) the motion compensation control modes between the horizontally drawn lines, c) the automatic emergency control mode below the horizontally drawn lines, d) the active motion compensation (AMC) control mode to the right of the vertically drawn line, and e) the hover motion compensation control mode to the left of the vertically drawn line.

In the hover motion compensation control mode, the desired position of the end point of the gangway is provided by a position reference that is tied to gangway landing spot on the stationary installation.

"TeleTension" Mode of Operation.

For situations where there is no horizontal or other suitable surface for the gangway end-point to land on, a "TeleTension" mode of operation the gangway is provided, in which a constant force is applied to the telescope joint or by suitably controlling and operating the actuator for telescope joint. When the state of "TeleTension" mode of operation is entered, the actuator for the telescope joint is operated to extend the telescopic joint with a predetermined, typically low velocity and increasing force until it reaches a threshold of resistance, as the end point of the gangway hits and gets into contact with its docking object. In practise, the hydraulic actuator for the telescope joint will continue to excert a pushing force until a target pressure is reached in the hydraulics, corresponding to the desired force that has been set or defined by an operator.

"Free" Mode of Operation.

When docking on a horizontal surface, free-mode can be enabled when a landing is detected by a load-cell at the endpoint of the gangway. This disables AMC, however instead of fading into manual it releases the force on the joints, such that the gangway will move freely between the vessel and the landing surface.

EXPLANATION OF REFERENCE SIGNS, ACRONYMS AND ABBREVIATIONS m: Vessel movement in measuring point
y: Current position vector in gangway geometry
ẏ: Current speed vector in gangway geometry
J: Joystick input. Moving $\bar{p}$ incrementally
p: Current gangway end position vector in world-frame
v: Current gangway end speed vector in world-frame
$\bar{p}$: Position reference vector in base-frame
$\bar{v}$: Speed reference vector in base-frame
$\alpha_0$: Locked position reference vector in gangway geometry. Locked at AMC startup. Used for fading in and out
α: Position reference vector in gangway geometry
α̇: Speed reference vector in gangway geometry
r: Position reference vector in gangway geometry after fading in and out. Fading in between $\alpha_0$ and α
ṙ: Speed reference in gangway geometry after fading in and out Fading between 0 and α
R: Regulator output
$\bar{R}$: Output for valve limited and souted for hydraulic systems

What is claimed is:

1. An apparatus for providing active motion compensation control of an articulated gangway which comprises at least one fixed part fixedly mounted on a sea going vessel, a movable part being movable relative to the fixed part, and at least one actuator for moving the movable part relative to the fixed part, the apparatus comprising:
   a first position reference device configured to provide, on a first output, position and attitude information of the vessel referenced to earth;
   a second position reference device configured to provide, on a second output, position and attitude information of the movable part referenced to the articulated gangway;
   an actuator driver device configured to generate an actuator control output in response to a regulator signal and
   an active motion compensation controller device having first and second inputs connected to said first and second outputs, respectively, an operator input for receiving an operator control input, and a third input for receiving velocity information of the movable part referenced to the articulated gangway,
   wherein the active motion compensation controller device comprises:
      a differential kinematic device configured to compute and output a current position and velocity of an articulated gangway endpoint referenced to earth in response to inputs of the position and attitude information of the vessel and the position and attitude information of the movable part;
      an active motion compensation device configured to compute and output a reference position and velocity of the articulated gangway endpoint referenced to the vessel in response to inputs of the operator control input and the current position and velocity computed by the differential kinematic device;
      an inverse kinematic device configured to compute and output a position reference and velocity reference of the articulated gangway endpoint referenced to the articulated gangway in response to inputs of the reference position and velocity computed by the active motion compensation device; and
      a regulator device configured to compute and output the regulating signal in response to inputs of the position reference and velocity reference computed by the active motion compensation device.

2. The apparatus of claim 1, wherein the active motion compensation device is further configured to output a locked position reference referenced to the articulated gangway, and the active motion compensation controller device further comprises a reference calculating device in a signal path between the inverse kinematic device and the regulator, the reference calculating device configured to compute and output to the regulator device a fade-in or fade-out position reference varying between the locked position reference and the position reference and a fade-in or fade-out velocity reference varying between 0 and the velocity reference in response to a fade-in or fade-out command.

3. The apparatus of claim 2, wherein the active motion compensation controller device further comprises a joint limiter device in a signal path between the reference calculating device and the regulator device, the joint limiter device configured to limit a value of at least one of fade-in or fade-out position reference and the fade-in or fade-out velocity reference in response to at least one operating limit associated with the at least one actuator.

4. The apparatus of claim 1, wherein the inverse kinematic device comprises an inverse kinematic solver device configured to compute and output the position reference on basis of the reference position by solving a three degrees of freedom inverse kinematic problem.

5. The apparatus of claim 1, wherein the inverse kinematic device comprises an inverse differential kinematic solver device configured to compute and output the velocity reference on basis of the reference velocity by solving a three degrees of freedom inverse differential kinematic problem.

6. A method for providing active motion compensation control of an articulated gangway which comprises at least one fixed part fixedly mounted on a sea going vessel, a movable part being movable relative to the fixed part, and at least one actuator for moving the movable part relative to the fixed part, the method comprising:

providing a first position reference device being configured to provide, on a first output, position and attitude information of the vessel referenced to earth;

providing a second position reference device being configured to provide, on a second output, position and attitude information of the movable part referenced to the articulated gangway;

providing an actuator driver device having configured to generate an actuator control output in response to a regulator signal; and providing an active motion compensation controller device having first and second inputs connected to respective ones of the first and second outputs, an operator input for receiving an operator control input, and a third input for receiving velocity information of the movable part referenced to the articulated gangway, wherein the active motion compensation controller device comprises:

computing and outputting by a differential kinematic device in the active motion compensation controller device, a current position and velocity of a articulated gangway endpoint referenced to earth in response to inputs of the position and attitude information of the vessel and the position and attitude information of the movable part;

computing and outputting by an active motion compensation device in the active motion compensation controller device, a reference position and velocity of the articulated gangway endpoint referenced to the vessel in response to inputs of the operator control input and the current position and velocity computed by the differential kinematic device;

computing and outputting by an inverse kinematic device in the active motion compensation controller device, a position reference and velocity reference of the articulated gangway endpoint referenced to the articulated gangway in response to inputs of the reference position and velocity computed by the active motion compensation device; and computing and outputting by a regulator device the regulating signal in response to inputs of the position reference and velocity reference computed by the active motion compensation device.

\* \* \* \* \*